Patented Dec. 31, 1940

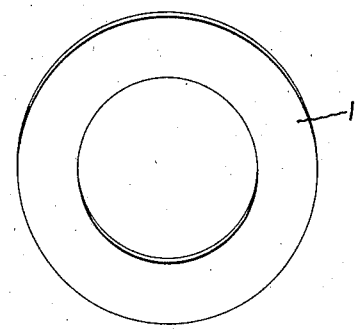
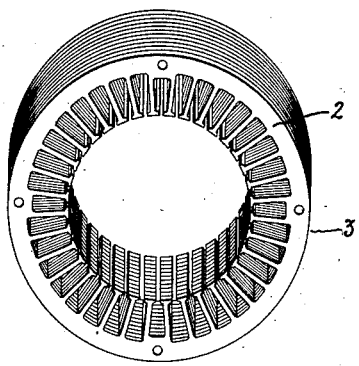
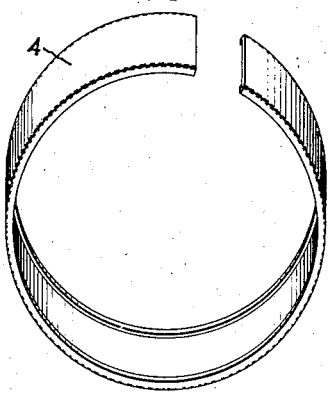
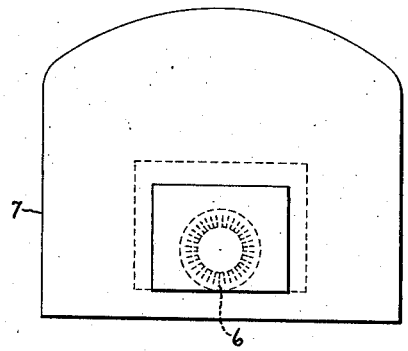
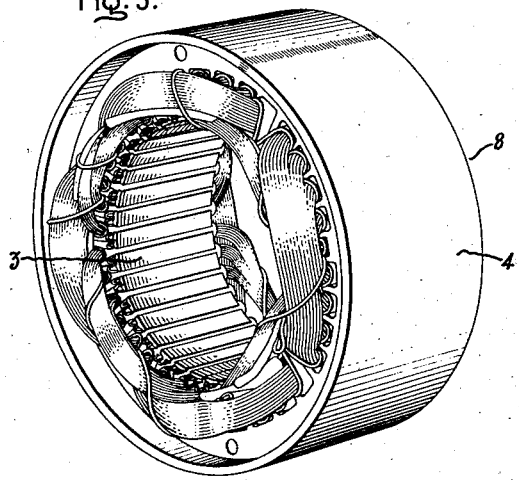

2,227,156

UNITED STATES PATENT OFFICE 2,227,156

TREATMENT OF ELECTRICAL APPARATUS

Robert T. Reardon, Fort Wayne, Ind., assignor to General Electric Company, a corporation of New York Application September 20, 1938, Serial No. 230,839

3 Claims. (Cl. 148—16)

The present invention relates to electric apparatus and more particularly to the production of assemblies comprising magnetic cores for such apparatus.

This application is a continuation-in-part of my co-pending application Serial No. 127,405, filed February 24, 1937, and assigned to the same assignee as the present invention.

In manufacturing certain types of electric equipment, as for example stators of motors, the general practice heretofore usually has been as follows:

Thin sheet or strip ferromagnetic material, as for example silicon steel, was stamped to form stampings or punchings of the desired size and shape. These punchings, stacked loosely in trays or boxes, were annealed in an inert or reducing atmosphere or as described in my above-identified application. This annealing treatment removed the stresses and strains set up in the steel by the punching operation and improved its magnetic properties. However, many of the annealed punchings would be distorted due to unequal expansion and contraction during annealing and cooling, or by reason of settling or shifting in the annealing trays, or for other reasons. Hence in assembling punchings into the shell of a stator they had to be clamped under substantial pressure to flatten the distorted members of the stack. This clamping set up further stresses and strains in the annealed laminations and obviated a substantial amount, in certain cases almost all, of the improvement in magnetic properties attained by annealing. More particularly, the magnetizing current is greatly increased at a definite operating density, the permeability reduced, and the hysteresis loss increased. To produce a motor which would meet a particular operating specification, it was therefore necessary either to use more copper (ampere turns), or more ferromagnetic metal or a higher quality and more costly metal for the magnetic core than would be required if the detrimental effect resulting from clamping the annealed laminations and fitting them into the stator structure could be avoided.

As pointed out in my above-identified co-pending application Serial No. 127,405, steel laminations such as used in electric motors may be assembled in proper position in the iron shell of the motor and the entire assembly including the iron shell then heat treated as therein described. More particularly, by the method of that application the assembly is heated first in an oxidizing atmosphere to form a tightly adhering insulating oxide film on the laminations and then in an atmosphere containing a reducing but non-carburizing gas, specifically hydrogen, to prevent the oxide-coated laminations from adhering to each other, or from becoming highly oxidized at high temperature desirable in developing the best magnetic properties.

In accordance with the present invention punchings of ferromagnetic material are assembled in the form of their ultimate use in electric apparatus. Specifically, punchings of such material in parallel, contacting relationship are firmly positioned within a tubular or other casing adapted to receive the same, for example, within the conventional shell of a stationary member (stator) of a dynamo-electric machine. The resulting assembly is heat treated at a temperature and for a period of time sufficient to improve in situ the magnetic properties of the punchings but insufficient to cause appreciable distortion of the assembly. During this heat treatment the assembly is surrounded by a gaseous atmosphere hereafter more particularly identified.

The novel features which characterize my invention are set forth in the appended claims. The invention itself will be understood most readily from the following more detailed description when considered in connection with the accompanying drawing wherein Figs. 1 to 4, inclusive, are illustrative of steps employed in producing assemblies embodying my invention; and Fig. 5 is a perspective view of a wound stator produced in accordance with the invention.

In carrying my invention into effect hot or cold rolled, mill annealed or semi-mill annealed, or other suitably treated sheet or strip iron or steel adapted for use in magnetic structures is punched or stamped in a desired manner. For example, the sheet material may be punched to form a punching 1 (Fig. 1), which in turn may be punched to form a slotted punching or lamination 2 (Fig. 2), a plurality of which are shown (Figs. 2 and 5) assembled together to form a magnetic core 3. The assembled slotted laminations are clamped, riveted or otherwise joined into the form in which they are to be used in electric apparatus. For instance, a wrapping 4 (Figs. 3 and 5) of sheet iron or other suitable sheet metal may be placed about the core 3 formed by the assembled laminations 2 as a shell or casing for the core. In producing such an assembly, which is designated by the numeral 6 in Fig. 4, the laminations should not be placed under such compression as to prevent infusion of gas between the laminae and the formation of a continuous, homogeneous, tightly adhering insulating oxide film on the surfaces thereof.

The assembly 6, which is shown in Fig. 4 within a suitable furnace 7, is therein heated in a suitable gaseous atmosphere, specifically one obtained by the combustion of hydrocarbon-containing material in a deficiency of air and consisting mainly of nitrogen, carbon monoxide, carbon dioxide, hydrogen and water vapor. The relative proportions of carbon monoxide, carbon dioxide, hydrogen and water vapor are such that the gaseous atmosphere, at least at the maximum heat-treating temperature, is non-oxidizing. Ordinarily, the gaseous atmosphere which envelops the assembly during the heat treatment to improve in situ the magnetic properties of the laminations has, at normal temperature, substantially the following composition:

| | Per cent by volume |
|---|---|
| Carbon monoxide | 3 to 12 |
| Carbon dioxide | 3 to 10 |
| Hydrogen | 3 to 25 |
| Water vapor | 0.8 to 3.5 |
| Nitrogen, sometimes also a small amount of hydrocarbon gases such as methane | Remainder |

In all cases the relative proportions of components are such that, at least at the maximum heat-treating temperature, the gaseous atmosphere is non-oxidizing (inert or reducing) and, usually, is reducing. Hydrocarbon gases such as methane have no deleterious effect other than that of a diluent when present in small amount as, for example, up to 5%. Usually less than 1% of such gases, if any, will be present.

Any suitable apparatus may be used for producing the enveloping gaseous atmosphere, for example apparatus such as described in Marshall Patent No. 2,085,597 and in Haskell Patent No. 2,085,584, both of which patents are assigned to the same assignee as the present invention.

The heat treatment can be carried out in a batch-type furnace or in a semi-continuous or continuous furnace. If the batch method is employed, the assemblies should be stacked on racks designed to minimize the possibility of distortion of the individual assembly during heat treatment. Advantageously the stacked assemblies are covered with a box or drum formed of suitable alloy and the air about the covered assemblies is displaced with an inert or reducing gas. Covering the load charged to the furnace with a drum is not absolutely necessary, but if not used the heat-treated assemblies upon removal from the furnace should be inserted promptly under a drum or other suitable structure for cooling.

The furnace previously has been brought to the desired heat-treating temperature, for example a temperature of approximately 800° to 860° C. when the assemblies comprise magnetic cores formed of silicon steel laminations. The racks (preferably covered) with the assemblies thereon are charged into the preheated furnace, the atmosphere therein comprising the above gaseous mixture. The temperature of the furnace atmosphere drops to 550° to 650° C., requiring about 3 hours to reach 800° to 860° C. again. The charge is held for an additional hour at this higher temperature. The covered assemblies are removed from the furnace, and the above-described gaseous composition is maintained (or a further amount may be introduced) under the cover for another hour, during which time the assemblies cool to an average temperature of about 600° to 700° C. The assemblies are cooled further under cover, discontinuing the introduction of gas if used, for another 2 to 3 hours, or longer if desired. Ordinarily they are cooled under cover to a temperature of the order of 275° to 475° C. before exposure to the air. By cooling under cover excessive oxidation of the assemblies is avoided. Further, shock chilling of the top and side assemblies of the load is obviated. Such chilling is to be avoided, since it causes rapid contraction of the metal, sets up strains in the laminations, distorts the parts, and results in loose assemblies.

Preferably the assemblies are continuously heat treated. A typical cycle in such case is to bring the work from room temperature (about 20° to 25° C.) to heat-treating temperature in approximately 1¾ hours, maintain it at such temperature for approximately ½ hour, followed by cooling to about 275° to 475° C. over a period of approximately 2½ hours before exposure to the air. During such heating and cooling the assemblies are enveloped by the above-described gaseous atmosphere comprising carbon monoxide, carbon dioxide, hydrogen and water vapor in suitable proportions. Relatively slow cooling, whether the assembly is heat-treated by batch, semi-continuous or continuous methods, is important in obtaining heat-treated assemblies with tightly fitting cores.

It will be understood, of course, that the particular temperatures used, and the particular rates of heating and cooling employed, will depend upon the particular assemblies processed and the particular metals of which they are composed. However, in annealing ordinary magnetic structures in situ the maximum annealing temperature usually will be within the range of 650° to 1100° C.

The heat-treated assemblies are fabricated into electric apparatus. Fig. 5 shows by way of illustration a wound stator 8, the shell and magnetic core of which were heat treated as an assembly in accordance with this invention.

The magnetic cores of assemblies which have been heat treated as herein described show higher permeability and reduced hysteresis losses as compared with cores formed of punchings similarly annealed prior to assembly. If the laminations comprising the core initially had no insulating oxide film thereon or were incompletely or non-uniformly coated with oxide, the described treatment causes a continuous, homogeneous, integral electrically insulating oxide film or coating to be formed on the surfaces of the laminations while the work is reaching the maximum heat-treating temperature and in cooling from such temperature to normal temperature. This insulating film reduces eddy and circulating current losses during use of apparatus comprising the assemblies of this invention. By properly proportioning the components of the gaseous mixture, fusion or sticking together of the oxide-coated laminations during heating and cooling is prevented. Further, a tightly adhering oxide film is formed on the edges of the laminae, including the edges adjacent the iron shell, as well as on the shell itself. Excessive oxidation of the iron shell and of the laminations is avoided. Hence mechanical cleaning of the shell, as by sand blasting, machining, buffing, etc., to remove scale is not necessary. No loose oxide or scale is formed. This is a matter of considerable importance, particularly when the assemblies are to be used in the construction of hermetically sealed refrigerator motors. The core is not loosened in the shell by the described treatment, but fits tightly therein as before heat treatment.

By heat treating assemblies comprising magnetic cores formed of suitably arranged punchings of ferromagnetic material to anneal in situ the punchings; that is to anneal the punchings to improve their magnetic properties while they are in the form of their ultimate use in electric apparatus, marked savings in manufacturing costs and substantial improvement in magnetic properties result. Specifically, a lesser amount of copper or of core material, or of both, is required, or a less costly ferromagnetic material can be used, to obtain practically the same permeability and hysteresis loss values shown by magnetic cores formed of punchings of the same dimensions and composition, which punchings are annealed in unassembled state under similar time-temperature conditions and subsequently assembled to form a magnetic core. Or, other conditions being the same, for the same kind and amount of ferromagnetic material assembled in core form into apparatus, substantially better electro-magnetic values (higher permeability and lower hysteresis losses) are obtained by practicing the method of this invention in comparison with the method above described.

What I claim as new and desire to secure by Letters Patent of the United States is:

1. The method which comprises the steps of assembling punchings of ferromagnetic material in the form of their ultimate use in electric apparatus, heat treating the assembly at a temperature and for a period of time sufficient to improve in situ the magnetic properties of the punchings but insufficient to cause appreciable distortion of the assembly, and enveloping the assembly during the said heat treating operation with an enveloping gaseous atmosphere containing carbon monoxide, carbon dioxide, hydrogen and water vapor so proportioned that the said atmosphere, at least at the maximum temperature of treatment, is non-oxidizing and prevents the punchings from sticking together during the heat treatment, and at lower temperatures is oxidizing to cause the formation of a continuous, homogeneous, integral, electrically insulating oxide coating on the punchings of ferromagnetic material.

2. The method which comprises the steps of assembling punchings of ferromagnetic material in the form of their ultimate use in electric apparatus, subjecting the assembly to heat treatment sufficient to improve in situ the magnetic properties of the punchings but insufficient to cause appreciable distortion of the assembly, cooling the heat-treated assembly, and surrounding the assembly during heating and cooling with an enveloping gaseous atmosphere capable of preventing the punchings from sticking together during the heat treatment, said atmosphere being obtained by the combustion of hydrocarbon-containing material in a deficiency of air and containing, by volume, from 3 to 12 per cent carbon monoxide, from 3 to 10 per cent carbon dioxide, from 3 to 25 per cent hydrogen and from 0.8 to 3.5 per cent water vapor, the relative proportions of the said components being such that at the maximum heat-treating temperature the said gaseous atmosphere is non-oxidizing and at lower temperatures the said gaseous atmosphere causes the formation of a continuous, homogeneous, integral, electrically insulating oxide coating on said assembly.

3. The method of forming a stationary member of a dynamo-electric machine which includes the steps of firmly positioning punchings of ferromagnetic material adapted to have formed thereon a continuous, homogeneous, integral oxide coating within a tubular casing adapted to receive the said punchings, heat treating the resulting assembly within a temperature range of 650° to 1100° C. in an enveloping gaseous atmosphere obtained by the combustion of hydrocarbon-containing gas in a deficiency of air and containing, by volume, from 3 to 12 per cent carbon monoxide, from 3 to 10 per cent carbon dioxide, from 3 to 25 per cent hydrogen and from 0.8 to 3.5 per cent water vapor, the relative proportions of the said components being such that, at least at the maximum heat-treating temperature, the said gaseous atmosphere is reducing and prevents sticking of the punchings, and at lower temperatures causes the formation on the surfaces of the encased punchings of a continuous, homogeneous, integral, electrically insulating oxide coating.

ROBERT T. REARDON.